May 31, 1960 H. C. QUARTIER 2,938,505
ANNULARLY SPACED OSCILLATING PISTON ENGINE
Filed April 30, 1958 3 Sheets-Sheet 1

INVENTOR
HARRY C. QUARTIER
BY Walter S. Pauw
ATTORNEY

May 31, 1960　　　H. C. QUARTIER　　　2,938,505
ANNULARLY SPACED OSCILLATING PISTON ENGINE
Filed April 30, 1958　　　　　　　　　　　　　3 Sheets-Sheet 2

INVENTOR
HARRY C. QUARTIER
BY *Walter S. Paul*
ATTORNEY

May 31, 1960     H. C. QUARTIER     2,938,505
ANNULARLY SPACED OSCILLATING PISTON ENGINE
Filed April 30, 1958     3 Sheets-Sheet 3

INVENTOR
HARRY C. QUARTIER
BY Walter S. Pawl
ATTORNEY

United States Patent Office 2,938,505
Patented May 31, 1960

2,938,505

ANNULARLY SPACED OSCILLATING PISTON ENGINE

Harry C. Quartier, P.O. Box 463, Kingman, Ariz.

Filed Apr. 30, 1958, Ser. No. 732,060

7 Claims. (Cl. 123—15)

This invention relates to rotary internal combustion engines and particularly to a four cycle internal combustion engine of the oscillating piston type.

Numerous attempts have been made in the past to construct a practical rotary internal combustion engine having oscillating pistons together with a rotor with which the pistons are operable. Such engines have inherent advantages over reciprocating engines in view of the high inertia forces and great accelerations that are developed in the ordinary crankshaft-piston train of reciprocating engines. Numerous drawbacks are generally encountered in the construction of rotary engines, although such engines have been placed in practical use.

An object of this invention is to provide a practical rotary engine of the type which has oscillating pistons. My engine has the pistons mounted pivotally so that they can oscillate as the rotor is set into motion by means of an ordinary starter. The invention possesses the feature of having the pistons carried by the stator so that they are not subjected to high radial forces developed in the rotor of the engine. The pistons oscillate but do not rotate with the rotor. This reduces the inertia problems in the engine and has the corresponding advantage of considerably attenuating the sealing problems generally encountered in rotary engines.

My engine, which typifies an embodiment of the invention, has pockets in the pistons that are used to translate a compressed charge of fuel-air mixture into the combustion chambers established by surfaces of the rotor and stator when they reach a particular spatial relationship to each other. By this construction the fuel handling problem in such an engine is overcome, this being one of the material difficulties encountered in other rotary engines.

A more specific object of the invention is to provide a rotary engine with a rotor and a casing that functions as a stator. The rotor has a number of cams on its periphery that coact with cam surfaces on pivotally mounted pistons carried by the stator and move the pistons in one direction in the oscillatory path of travel of each piston. The pistons are projected into the space between the perimeter of the rotor and the inner surface of the stator casing by springs having a correct spring constant, with the spring rate selected to move the pistons rapidly into the previously mentioned space. As the pistons are moved radially outwardly of the engine axis, the fuel admission timing is such that a charge of fuel is behind the pistons and is compressed into a pocket in the piston so that compressed fuel may be delivered with the piston as it is returned into the space between the rotor periphery and the stator inner surface. When so transported, the fuel is ready for firing. The ignition cycle is timed to fire the fuel preferably slightly prior to the reaching of the inward limit of travel of the pistons so that the full force of the expanding gases is expended against the movable face of the combustion chamber. This movable face of the combustion chamber is established by a surface of the cam on the rotor which has at this moment in the rotary cycle of operation of the engine, passed the trailing edge of the piston.

An engine designed in accordance with the invention has the distinct advantage of being either a high torque or low torque engine with corresponding power development. In order to increase the torque of the engine it is necessary only to increase the radial distance between the axis of the engine and the pistons together with their operating cams. Reduction in torque would have a smaller diameter engine insofar as the same radial distance is concerned. Moreover, the number of power strokes for each rotor revolution can be altered by changing the rotor so that it has a greater or smaller number of cams thereon. The same holds true for the number of pistons. They can be increased or decreased from the four piston embodiments illustrated in the drawings.

Other objects and features of importance will become apparent in following the detailed description of an engine structure described subsequently.

Figure 1:
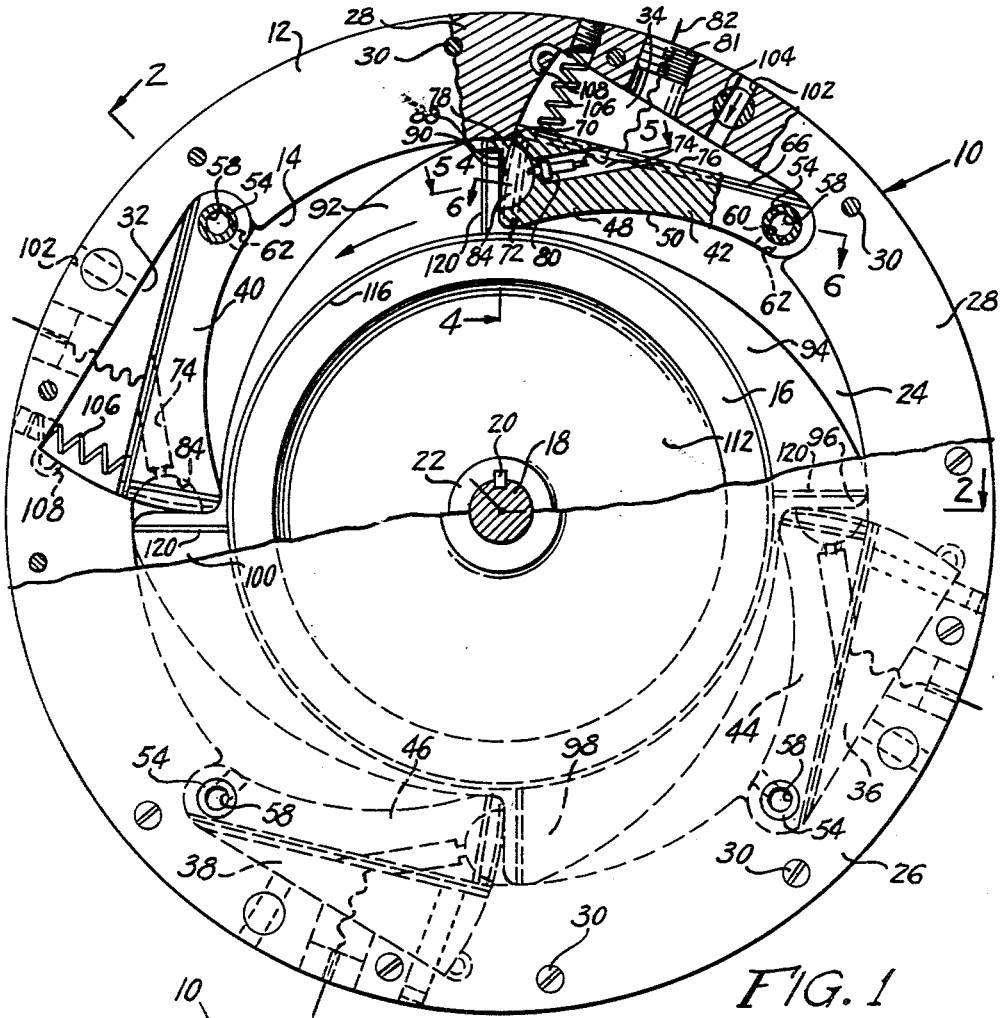
Fig. 1 is an elevational view, parts broken away in section, of my engine having four pistons and four rotor chambers.

In the accompanying drawings there is a rotary internal combustion engine 10 constructed to exemplify the principles of the invention. The engine consists of a stator 12 made of an engine casing having a cylindrical cavity 14, together with a rotor 16 that is mounted on shaft 18 and in cavity 14. Shaft 18 has rotor 16 fixed to it by any of the common expedients, for instance by key 20 disposed in a keyway in shaft 18 and in the rotor hub 22. The shaft has oil seals (not shown) and is mounted for rotation in bearings (not shown) such as would be required to withstand the stresses imposed on the shaft 18. The starter for the engine can be drivingly connected to the shaft, and the same shaft can be used as the power take-off.

Figure 2:
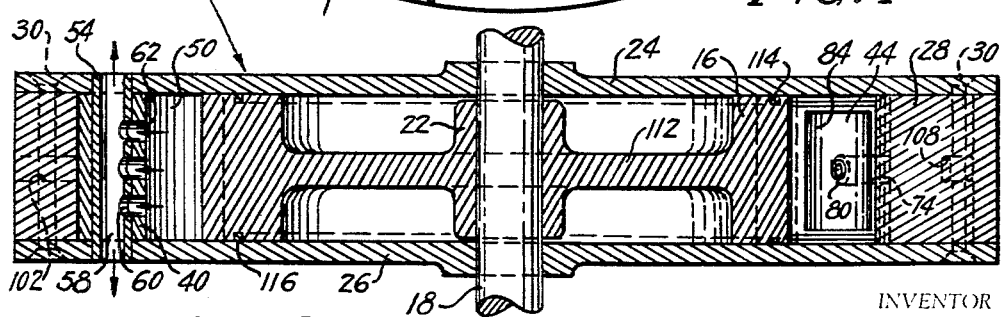
Fig. 2 is a sectional view taken on the line 2—2 of Fig. 1.
Figure 3:
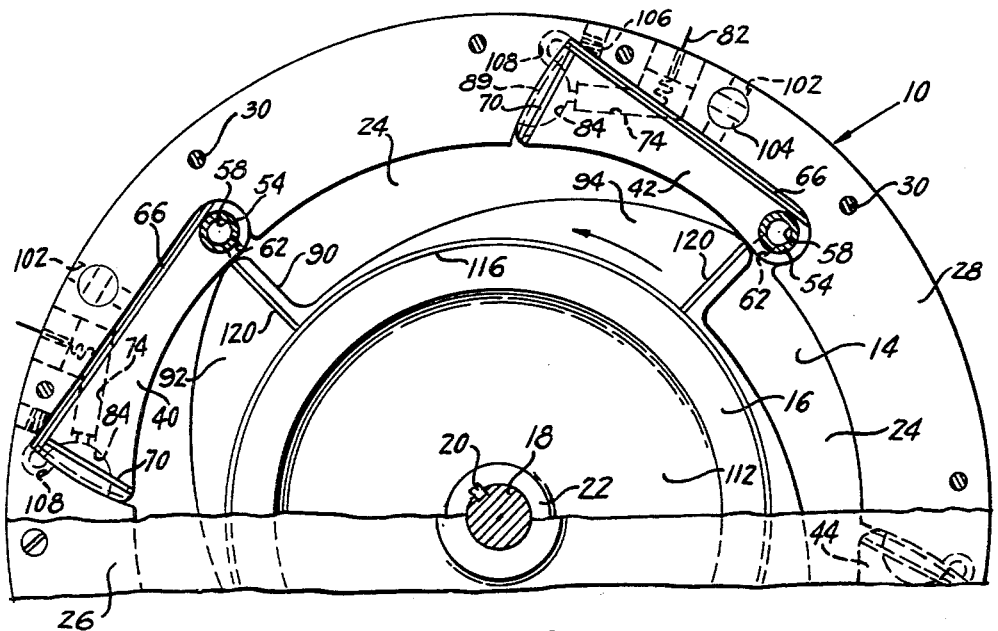
Fig. 3 is a fragmentary elevational view with parts shown in section and quite similar to Fig. 1 but showing the rotor displaced approximately 45 degrees from the position that it occupies in Fig. 1.
Figure 4:
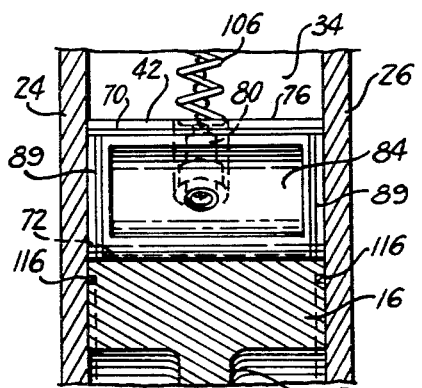
Fig. 4 is an enlarged sectional view taken on the line 4—4 of Fig. 1.
Figure 5:
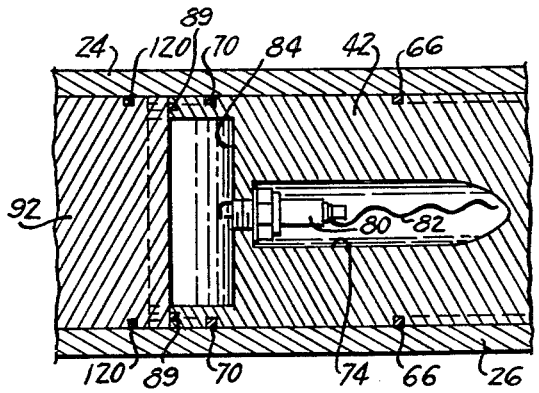
Fig. 5 is an enlarged sectional view taken on the line 5—5 of Fig. 1.
Figure 6:
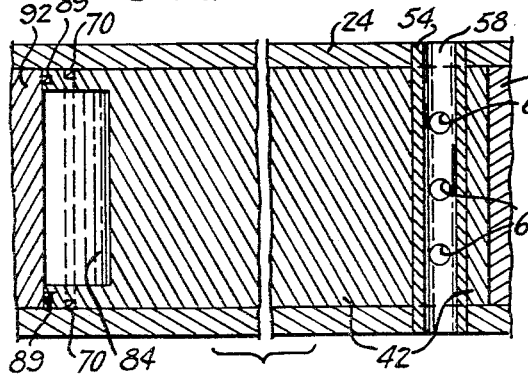
Fig. 6 is an enlarged sectional view taken on the line 6—6 of Fig. 1.

Casing 12 is constructed of two end plates 24 and 26 in the center of which the previously mentioned shaft bearings are mounted. The end plates are secured to an annular member 28, as by bolts 30 thereby enclosing cavity 14. Member 28 has a plurality of inwardly opening recesses 32, 34, 36 and 38 within which four pistons 40, 42, 44 and 46 are operable. Each piston is identical as is each of the recesses to accommodate the pistons. Piston 42 typifies the others and consists of a lever-mounted body 48 with a curved cam surface 50 on its inner face. One end of the body 48 has a hollow pivot pin 54 passed through it and mounted in the end plates 24 and 26 of the engine casing or stator. The pivot pins 54 for each piston serve a plurality of functions. The first is to support the piston for oscillatory, pivotal movement, while the second function is to act as a conduit through which exhaust gases flow (see arrows in Fig. 2). Being hollow, pivot pin 54 has a passage 58 and a plurality of lateral exhaust ports 60 registered with the hollow passage. The exhaust ports have exhaust port extensions 62 through the material of piston body 48 and these are in registry with cavity 14. The exhaust gas from each combustion chamber is scavenged through the ports 60 and their extensions 62 together with passage 58 for each pivot.

Longitudinal seals 66 are fitted in grooves on each side of each piston and they abut the inner surfaces of the end plates 24 and 26 to prevent the escape of exhaust gases. Seal 70 is at the non-pivoted end of each piston, and circumferential seal 72 is formed as a band around three sides of each piston. All of the piston surfaces that are in moving contact with the stator, therefore, have seals so that gases cannot blow by the pistons. The seals can be of any material such as soft iron as used in piston grooves of reciprocating engines. Other types of seals that are in common use, for example chromium plated piston ring substance can be adopted with the hardness ratio between the engine rotor material, stator material and pistons, properly engineered.

Each piston has a bore 74 extending through its inner surface 76 and terminating a distance behind the front face 78 of the piston. The bore accommodates an ignition device, for example spark plug 80, to which ignition wire 82 is secured. Wire 82 is passed through opening 81 in stator member 48. The electrode end of the spark plug opens into pocket 84 that is formed in face 78 of the piston. The pocket is shown with a curved inner surface, although this shape is subject to engineering change. The presence of the pocket in this location is of importance because the pocket moves with the piston to translate a compressed charge of fuel-air mixture from the inner part of the recess for the piston to the combustion chamber that is appurtenant to the piston under consideration. Piston 42 has combustion chamber 88 in advance of it and is made of the front face 78 of the piston, a small part of the inner surface of member 28, a small part of the adjacent end plates 24 and 26 and the rear wall or surface 90 of cam lobe 92 of the rotor 16 when the rotor is in the position shown in Fig. 1. Wall 90 is the movable wall of the combustion chamber since it is on the cam 92, and cam 92 rotates as a part of the rotor. When the next cam 94 progresses to the position where it reacts on piston 42, the trailing wall 96 thereof then becomes the movable wall of the combustion chamber 88 for piston 42. Continuing with the rotation of rotor 16, the cam 98 then coacts with piston 42, and subsequently cam 100 of rotor 16 coacts with piston 42 for the same purpose.

The fuel and air induction is accomplished by having an inlet passage 102 for recess 34, and there is a like induction passage for each recess. Any kind of valve can be used to control the admission of fuel-air mixture through induction passage 102, and therefore I have illustrated a rotary valve 104 because of its smoothness and silence in operation. The timing device for the valves 104 can be selected from a wide variety of known timing structures, such as sprockets and chains, direct gear drives and others. As is common in this type of invention the valve timing and ignition firing must be synchronized.

The rest position for the piston 42 is with cam surface 50 pressed firmly against the long cam surface of each piston by spring 106. The spring retains the cam surfaces of each piston and the rotor cams in firm contact with each other. Spring 106 is in a shallow well in piston body 48 and in a shallow well in the member 28 whereby the spring is held captive but able to work freely between its limits of operation.

A short plenum chamber 108 is registered with recess 34, opening through one of its walls. The function of the chamber 108 is to accept some of the charge while it is being compressed in the recess 34 prior to entering pocket 84.

The operation of the engine is now quite evident. Fuel is introduced through induction passages 102 as controlled by the valves 104, one being provided in each passage. At the time of introduction of fuel, the position of the piston is such that nominal pressure is required to introduce the fuel, inasmuch as a suction stroke is established during the radial inward movement of the pistons. The radial inward motion of each piston is caused by springs 106 and the shapes of the cams on the rotor. After fuel induction, the charge is compressed. The compression (see Fig. 1) takes place by having the rotor cam located behind the piston, move the piston inwardly of its recess. Assuming a counterclockwise rotation of rotor 16, the piston 42 of Fig. 1 is about to be moved into its compression stroke by the long cam surface on cam 94. The inward movement of the piston is yieldingly opposed by spring 106. During this movement of the piston the charge is compressed into plenum chamber 108 which has an end that registers with pocket 84 during the innermost portion of the travel of the piston 42.

Then, upon movement of the rotor slightly further in the counterclockwise direction, the end of the piston slips over the thickest or highest part of cam 94 and rapidly drops behind the rear wall of the cam 94 to establish a combustion chamber as previously described and in advance of the front face of the piston. At a selected part of the oscillatory movement of the piston 42, the fuel mixture is ignited. Since the piston is now in a tangential position relative to the rotor, the full force of the expanding gases is expended tangentially on the rotor and against the wall 90 of the cam of the rotor. This provides an impulse for the rotor. At the same time other pistons are undergoing different portions of their separate cycles of operation and by the other cams on the rotor.

When the charge that is fired has spent itself, the succeeding cam on the rotor continues to move in the counterclockwise direction (Fig. 1) so that the slope of the long gradual curve of the cam enables the piston to move in a direction to decrease the volume of the combustion chamber. Further motion of the rotor in the same direction causes the major thickness portion of the preceding cam to pass the port extensions 62, ports 60 and passage 58 of the preceding (with respect to the direction of rotation) piston pivot pin. Therefore the preceding cam acts as a valve, opening the port extensions 62 and hence the combustion chamber enabling the spent exhaust gases to be scavenged. The gradual sloping shape of the succeeding cam squeezes the exhaust gases through the exhaust passage 58 to achieve the necessary scavenging.

There is a cavity 112 in the center part of the rotor 16 adjacent to the webs of the rotor. This cavity can function as an oil reservoir to assure correct lubrication. Moreover, shaft 18 can have a central passage and lateral ports that open into cavity 112 and open into other parts of the engine for pressure lubrication. Annular seals 114 and 116 on the faces of the rotor, and radial seals 120 on the rotor cams engage the confronting surfaces of end plates 24 and 26 to prevent blow-by.

Figure 7:
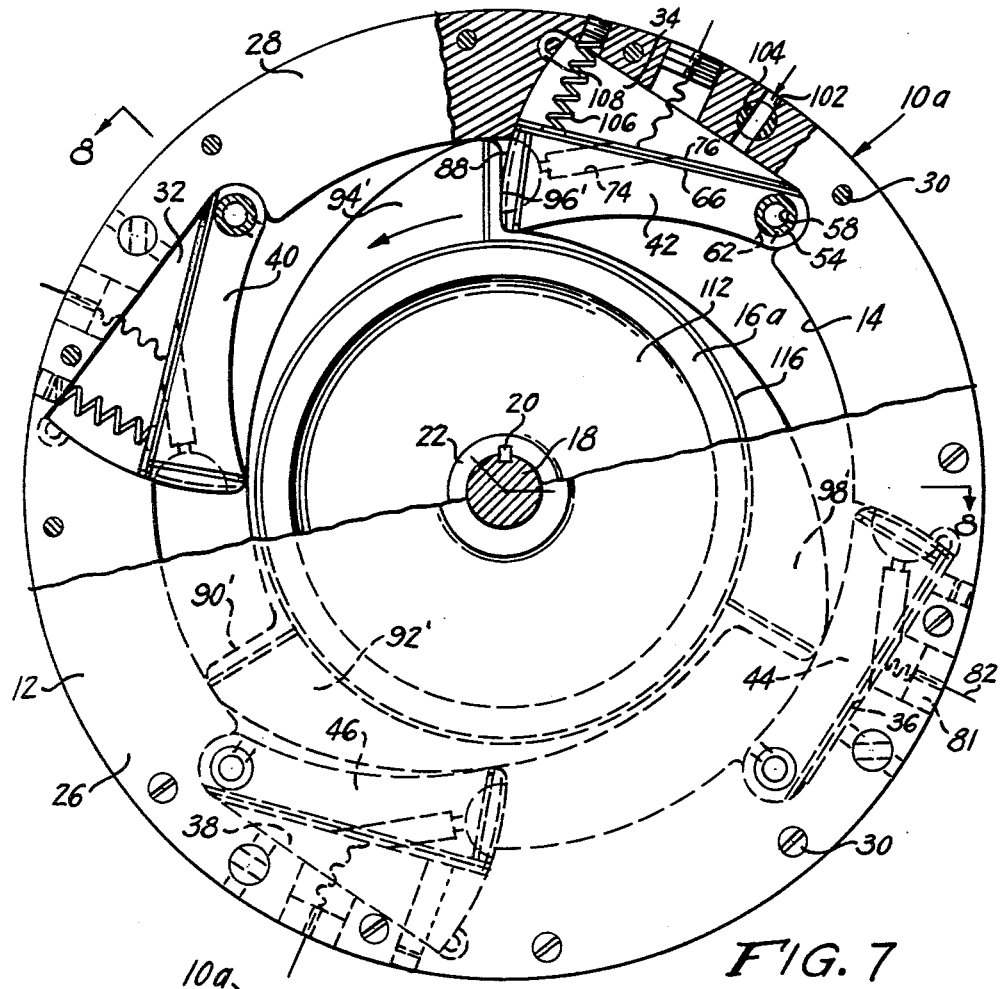
Fig. 7 is an elevational view somewhat similar to Fig. 1 but showing a modified form of the invention wherein there are three rotor chambers for cooperation with the four pistons thereby providing twelve staggered impulses during each revolution of the engine rotor.
Figure 8:
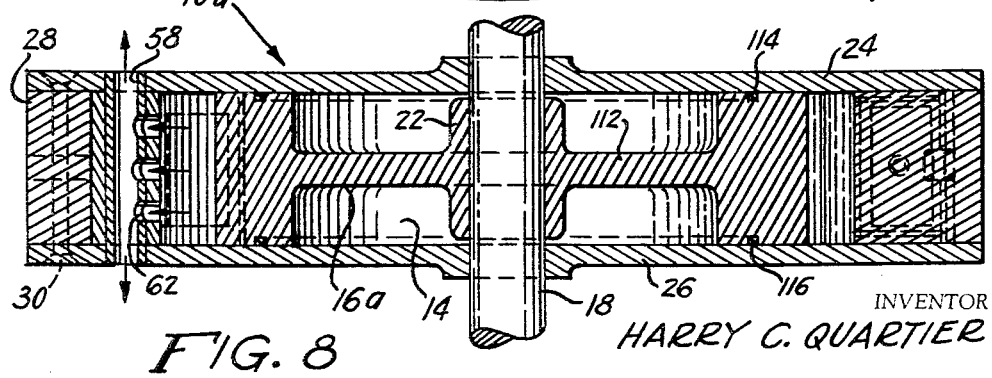
Fig. 8 is a sectional view taken on the line 8—8 of Fig. 7.

The same lubrication system can be adopted for the engine in Fig. 7. However, the illustration in Fig. 7 is principally to show rotor 16a which has a smaller number of cams on its periphery for the same number of pistons in the stator. This will change the number of impulses per revolution of the engine 10a. Any number of permutations in the number of pistons and cams can be adopted. The resultant engine will have different operating characteristics in this group of options, as to the number of pistons and cams that coact therewith.

It is understood that various changes, modifications, alterations and the like may be made without departing from the scope of the invention as claimed.

What is claimed is:

1. In a four cycle rotary internal combustion engine, the combination of a stator composed of a casing that has an inner cavity, side walls and a casing member to which said side walls are secured and enclosing said cavity, said casing member having a plurality of spaced recesses therein which open inwardly of said cavity, fuel induction means associated with each recess, valves controlling said fuel induction means, a piston pivoted at one end and disposed to swing into each of said recesses, the inner wall of each piston and the walls of the corresponding recess within which said piston is mounted defining a compression chamber in said recess, a rotor in said cavity having a plurality of cams, each piston having an outer cam surface in contact with said cams as said rotor moves, a depression in the arcuate end face of each piston for accepting a compressed charge of fuel when said piston is swung inwardly of its recess and for moving the charge into said cavity and behind a face of each cam, said cam faces constituting a movable wall of a combustion chamber with the other walls of said combustion chamber constituted by the surfaces of the end face of said piston and surfaces of said cavity whereby an impulse is applied to said rotor in response to expansion caused by burning of the fuel in said chamber, said charge accepting means comprising a depression in the outer end face of each piston, a plenum passage in registry with each recess and adapted to be registered with the depression of each piston when said pistons are swung radially outwardly of the rotor by said cams so that the gaseous charge that is compressed by the radial outward movement of said pistons is accepted in said pockets, said means mounting said pistons for pivotal movement including pivot pins, each pivot pin having an exhaust passage and at least one port registered with said cavity and said exhaust passage, said ports and passages of each pin constituting exhaust gas scavenging means for the combustion chambers.

2. In a four cycle rotary internal combustion engine, the combination of a stator composed of a casing that has an inner cavity, side walls and a casing member to which said side walls are secured and enclosing said cavity, said casing member having a plurality of spaced recesses therein which open inwardly of said cavity, fuel induction means associated with each recess, valves controlling said fuel induction means, a piston pivoted at one end and disposed to swing into each of said recesses, the inner wall of each piston and the walls of the corresponding recess within which said piston is mounted defining a compression chamber in said recess, a rotor in said cavity having a plurality of cams, each piston having an outer cam surface in contact with said cams as said rotor moves, a depression in the arcuate end face of each piston for accepting a compressed charge of fuel when said piston is swung inwardly of its recess and for moving the charge into said cavity and behind a face of each cam, said cam faces constituting a movable wall of a combustion chamber with the other walls of said combustion chamber constituted by the surfaces of the end face of said piston and surfaces of said cavity whereby an impulse is applied to said rotor in response to expansion caused by burning of the fuel in said chamber, said charge accepting means comprising a depression in the outer end face of each piston, a plenum passage in registry with each recess and adapted to be registered with the depression of each piston when said pistons are swung radially outwardly of the rotor by said cams so that the gaseous charge that is compressed by the radial outward movement of said pistons is accepted in said depressions, said means mounting said pistons for pivotal movement including pivot pins, each pivot pin having an exhaust passage and at least one port registered with said cavity and said exhaust passage, said ports and passages of each pin constituting exhaust gas scavenging means for the combustion chambers, seals on each piston and in engagement with surfaces of said cavity, and seals on said rotor and in contact with said walls of said stator.

3. The engine of claim 2, wherein each piston is approximately tangential to the axis of rotation of said rotor when the pistons are extended from their recesses.

4. In a rotary engine, a rotor provided with a plurality of cams that have sloping cam surfaces and an abruptly angled wall at one end thereof, a stator consisting essentially of a casing that has an annular member and side walls enclosing a cavity within which said rotor is operable, said annular member having a plurality of recesses which open inwardly of said cavity and which are circumferentially spaced, a piston in each recess, means mounting said pistons for pivotal biased movement radially inwardly and cam actuation outwardly of said rotor, each piston having a cam surface in engagement with said sloping cam surfaces and a front face provided with a depression, said front face and said angled wall of each cam together with portions of the inner surfaces of said cavity defining combustion chambers, each recess having a piston operable inwardly thereof and outwardly thereof during compression and charge transfer strokes of said piston respectively, said cams moving said pistons inwardly of said recesses to compress a gaseous charge therein, means for introducing fuel into said recesses to be compressed in response to movement of said pistons inwardly of said recesses, a passage in said casing registered with each recess and adapted to receive the gaseous charge as it is compressed in said recess, at least a part of each passage registered with said depression when the corresponding piston is moved inwardly of said recesses so that the compressed gaseous charge is accepted by and received into said depression, resilient means reacting on each piston for urging said pistons radially inwardly of said rotor so that when said rotor is moved to a position where each angled wall of said cams passes said front face of said piston the charge in said depression may be expanded with said angled wall of said cams of said rotor constituting the movable wall of the expansion chamber, said means mounting said pistons for pivotal movement in said recesses comprising pivot pins, and means for scavenging the exhaust gases from said chambers after said exhaust gases are spent with said sloping surfaces of said cams urging the exhaust gases through said scavenging means, said scavenging means consisting of a passage in each pivot pin and ports registering said cavity with said passage.

5. In an engine, the combination of a rotor and a stator, said rotor having a plurality of cams, said stator having a cavity within which said rotor and cams are operable, a plurality of oscillatable pistons carried by said stator and movable radially inwardly and outwardly of said rotor, a wall of said cams and a wall of said pistons coacting to form a portion of a combustion chamber within which a gaseous charge is adapted to be expanded to provide a power impulse on the rotor, pivot pins mounting said pistons for oscillatory movement, each pivot pin having a passage through which exhaust gases are adapted to be scavenged, and said pivot pins located adjacent to one end of each piston with the wall of said piston that constitutes a part of each combustion chamber located at the opposite end of said piston.

6. In an engine, the combination of a rotor and a stator, said rotor having a plurality of cams, said stator having a cavity within which said rotor and cams are operable, a plurality of oscillatable pistons carried by said stator and movable radially inwardly and outwardly of said rotor, a wall of said cams and a wall of said pistons coacting to form a portion of a combustion chamber within which a gaseous charge is adapted to be expanded to provide a power impulse on the rotor, pivot pins mounting said pistons for oscillatory movement, each pivot pin having a passage through which exhaust gases are adapted to be scavenged, and said pivot pins located adjacent to one end of each piston with the wall of said piston that constitutes a part of each combustion chamber located at the opposite end of said piston, resilient means reacting on each piston and moving said piston radially inwardly of said rotor with a portion of the surface of said piston in contact with said cams.

7. The engine of claim 6 wherein said cams have comparatively long sloping surfaces in advance of the wall that constitutes part of said combustion chambers, and said sloping surfaces constituting means by which to squeeze the spent exhaust gases through said passages as said rotor is rotated.

References Cited in the file of this patent

UNITED STATES PATENTS

| | | |
|---|---|---|
| 1,015,663 | Bonsteel | Jan. 23, 1912 |
| 1,225,056 | Riggs et al. | May 8, 1917 |
| 1,337,218 | Glaze | Apr. 20, 1920 |
| 1,790,256 | Wright | Jan. 27, 1931 |
| 1,828,228 | Kempton | Oct. 20, 1931 |
| 2,175,265 | Johnson | Oct. 10, 1939 |
| 2,250,484 | Jutting | July 29, 1941 |
| 2,821,176 | Koser et al. | Jan. 28, 1958 |